United States Patent
Annicchiarico

(10) Patent No.: US 11,105,353 B2
(45) Date of Patent: Aug. 31, 2021

(54) CONNECTION SYSTEM FOR CONNECTING TWO OR MORE OVERLAPPING LAYERS OF MATERIAL, AND RELATED JOINT AND CONNECTION METHOD

(71) Applicant: C.R.F. Società Consortile per Azioni, Orbassano (IT)

(72) Inventor: Antonio Annicchiarico, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 245 days.

(21) Appl. No.: 16/369,563

(22) Filed: Mar. 29, 2019

(65) Prior Publication Data
US 2019/0309776 A1 Oct. 10, 2019

(30) Foreign Application Priority Data
Apr. 10, 2018 (EP) .................................. 18166629

(51) Int. Cl.
*F16B 5/04* (2006.01)
*F16B 19/10* (2006.01)
*B21J 15/02* (2006.01)
*F16B 19/05* (2006.01)

(52) U.S. Cl.
CPC .............. *F16B 5/04* (2013.01); *B21J 15/022* (2013.01); *F16B 19/05* (2013.01); *F16B 19/1036* (2013.01)

(58) Field of Classification Search
CPC .. F16B 5/04; F16B 19/00; F16B 19/04; F16B 19/05; F16B 19/06; F16B 19/08;
(Continued)

(56) References Cited

U.S. PATENT DOCUMENTS 2,120,530 A * 6/1938 Shippee .................... F16B 5/10
411/349
2,194,458 A * 3/1940 Eckler ..................... F16B 19/06
411/504
(Continued)

FOREIGN PATENT DOCUMENTS

DE     102010000500 A1    8/2011
DE     102011103723 A1   12/2012
FR          3024507 A1    2/2016

OTHER PUBLICATIONS

European Search Report dated Oct. 10, 2018 (8 pages).

*Primary Examiner* — Roberta S Delisle
(74) *Attorney, Agent, or Firm* — RMCK Law Group PLC

(57) ABSTRACT

A connection system for connection of two or more overlapping layers of material includes: a rivet having a head and a stem, the head being configured to bear upon a surface of a first layer of the layers of material, the stem having an outer surface that includes a surface sculpturing and being configured for passing through the layers of material and projecting beyond them; and a washer configured to fit on the stem and configured to bear upon a surface of a last layer of the layers of material, the washer being deformable by axial compression from an undeformed condition where it fits on the stem with play, to a deformed condition where it fits on the stem in a condition of interference with the outer surface of the stem. Moreover described is a corresponding method for joining the layers of material using the connection system.

10 Claims, 2 Drawing Sheets

(58) Field of Classification Search
CPC .............. F16B 19/1027; F16B 19/1036; F16B 19/1081; F16B 19/109; F16B 21/00; F16B 21/086; F16B 21/12; B21J 15/02; B21J 15/022
USPC .................. 411/360, 361, 362, 500–502, 504
See application file for complete search history.

(56) References Cited

U.S. PATENT DOCUMENTS

| | | | | |
|---|---|---|---|---|
| 2,196,144 A * | 4/1940 | Eckler | ..................... | F16B 19/06 411/504 |
| 2,395,667 A * | 2/1946 | Keller | ................... | B21J 15/022 29/510 |
| 2,482,391 A * | 9/1949 | Webster | .............. | F16B 19/1027 411/361 |
| 3,094,017 A * | 6/1963 | Siebol | ..................... | F16B 19/05 29/506 |
| 3,304,830 A * | 2/1967 | Shackelford | ........ | B25B 27/0007 411/500 |
| 3,551,015 A * | 12/1970 | Whiteside | ............... | F16B 19/04 403/408.1 |
| 3,747,466 A * | 7/1973 | Rosman | ................... | B21J 15/02 411/361 |
| 3,747,467 A * | 7/1973 | Rosman | ................... | B21J 15/28 411/361 |
| 5,009,557 A * | 4/1991 | Dessirier | .................. | B21J 15/02 29/524.1 |
| 2013/0209196 A1* | 8/2013 | Brewer | .............. | F16B 19/1054 411/500 |

* cited by examiner

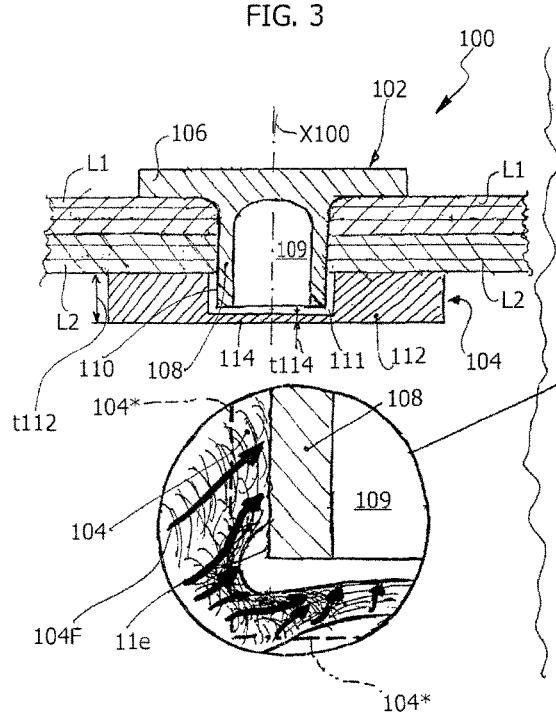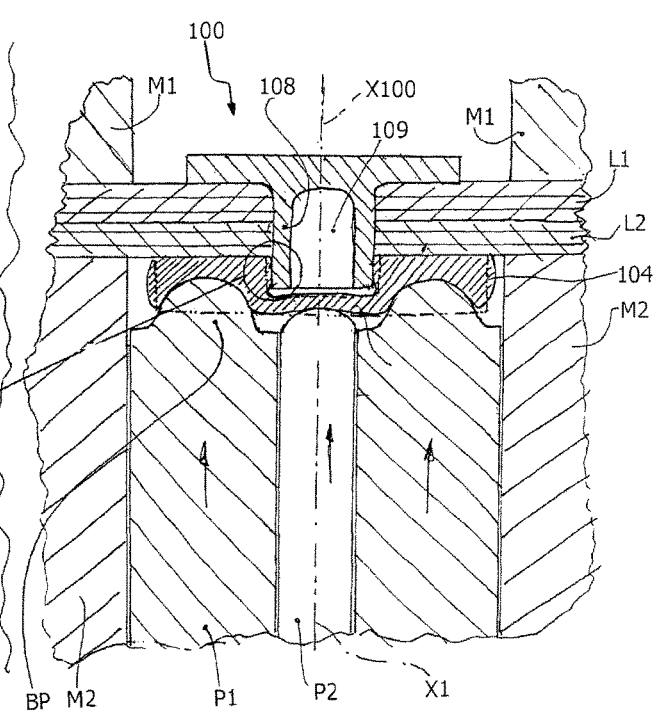

CONNECTION SYSTEM FOR CONNECTING TWO OR MORE OVERLAPPING LAYERS OF MATERIAL, AND RELATED JOINT AND CONNECTION METHOD

CROSS-REFERENCE TO RELATED APPLICATION

This application claims priority to European Patent Application No. 18166629.8 filed Apr. 10, 2018. The disclosure of the above application is incorporated herein by reference in its entirety.

FIELD OF THE INVENTION

The present invention relates to joining systems for connecting two or more overlapping layers of material, for example layers of sheet material such as composite materials and/or metal materials. In particular, the invention has been developed with reference to a rivet joining system.

Prior art and general technical problem Joining of layers of material, in particular of composite material, currently creates various problems in the case where it is desired to use a connection system other than gluing, in so far as traditional solutions of mechanical joining are barely suitable for the mechanical properties of this type of material.

For instance, in the case where a mechanical rivet joint were to be used, the overlapping materials must withstand both introduction of the rivet itself and surface abrasion due to the operation of closing of the rivet, which may be the source of fatigue failures and/or unsightly effects that render the joint not acceptable for industrial use, for example, for the production of motor-vehicle items.

OBJECT OF THE INVENTION

The object of the present invention is to provide a rivet connection system for two or more overlapping layers of material that will solve the technical problems mentioned previously. In particular, the object of the invention is to provide a rivet connection system that will prevent any abrasion of, or damage to, the layers of material joined thereby, at the same time ensuring the required structural strength.

SUMMARY OF THE INVENTION

The object of the present invention is achieved by a system, a joint, and a method having the features forming the subject of one or more of the ensuing claims, which provide an integral part of the technical disclosure provided herein in relation to the invention.

BRIEF DESCRIPTION OF THE DRAWINGS

The invention will now be described with reference to the annexed drawings, which are provided purely by way of non-limiting example and in which:

FIGS. 3, 4, and 4A are similar to FIGS. 1, 2, and 2A, respectively, but refer to a second embodiment of the connection system according to the invention.

DETAILED DESCRIPTION

Figure 1:
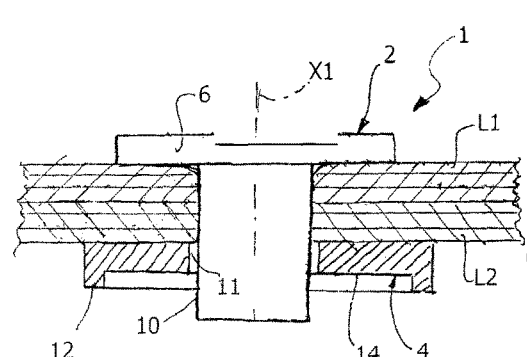
FIG. 1 is a cross-sectional view of a first embodiment of a connection system according to the invention, illustrated in a condition preliminary to closing of the joint.

The reference number 1 in FIG. 1 designates as a whole a connection system for connection of two or more overlapping layers of material, here identified by the references L1 and L2. In general, the layers that can be joined together may be in a number higher than two and are preferably layers of composite material, for example composite material with polymeric matrix reinforced with carbon fibre or glass fibre. In alternative embodiments, it is moreover possible to join metal-matrix composite materials or else hybrid complexes comprising metal-matrix composite materials and polymeric-matrix composite materials. In further alternative embodiments, hybrid joining of a layer of composite material and a layer of metal material is moreover envisaged.

The connection system 1 comprises a rivet 2 and a washer 4. The rivet 2 includes a head 6, preferably of a circular shape, and a stem 8 of cylindrical shape. The head 6 and the stem 8 are provided integrally with one another.

Figure 2:
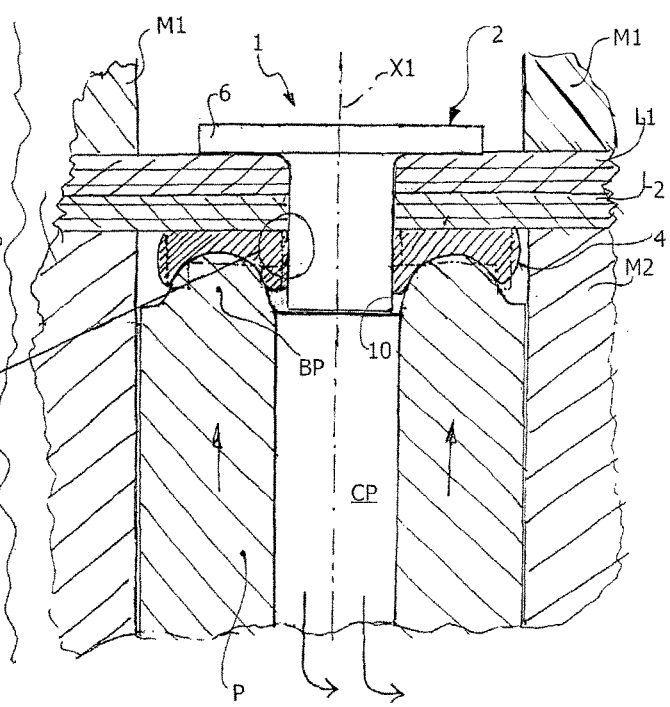
FIG. 2 is a cross-sectional view corresponding to that of FIG. 1 but relevant to an operation of closing of the joint.

In the embodiment of FIGS. 1 and 2, the stem 8 is a solid body and has an outer surface 10 provided with a surface sculpturing, preferably throughout its extension, and in any way along an axial extension that covers at least 80% of the length starting from the free end of the stem opposite to the head 6.

The above surface sculpturing may include, for example, a knurling or else a complex of circular surface ridges sharing an axis X1 of the joint.

As may be seen in FIG. 1, the head 6 of the rivet 2 is configured to bear upon a first layer of the two or more layers of material—in this case the layer L1 —, whereas the stem 8 is configured for passing through all the layers of material and projecting axially beyond them, in particular beyond the last of the overlapping layers (opposite to the first layer), which here corresponds to the layer L2.

The washer 4 is in this embodiment provided as an annular element with a central through hole 11 and a peripheral edge 12 that surrounds a flange 14 internal to the peripheral edge. The flange 14 is comprised between the through hole 11 and the edge 12, and preferably has a thickness measured in an axial direction (X1) smaller than the thickness of the edge 12.

The washer 4 is configured to fit on the stem 8 and to bear upon an (outer) surface of the last one of the overlapping layers, here the layer L2, so as to fasten the joint according to the method that will now be described.

At the moment of setting up the connection system 1, it is first required to provide two or more layers of material L1, L2 at a joining area where it is desired to connect the layers permanently to one another. This joining area may, for example, correspond to an area where two or more flaps or bands of two components to be connected together are set on top of one another.

The layers L1 and L2 are then clamped at opposite ends of the overlapping area, for example by means of a complex of clamping dies M1, M2, which are not represented in FIG. 1 for simplicity, but may be seen in FIG. 2. The clamping dies form part of a tool-kit that is used for creating the joint. Clamping of the layers L1, L2 precedes introduction of the rivet 2 in order to prevent failure of the layers at the moment of insertion thereof.

Once clamping has been carried out, the rivet 2 is introduced through the layers themselves. Introduction of the rivet 2 shears the layers L1, L2 in the section where the stem 8 penetrates and terminates at the moment when the head 6 comes into the contact with the layer L1, with the stem 8 that passes right through the stack of overlapping layers L1, L2 to project axially beyond the layer L2. Axial projection beyond the last layer L2 is required for fitting the washer 4 and fastening the joint.

In this regard, the stem 8 must have an axial length greater than the combined thickness of the layers of material L1, L2 (whatever their number) packed together, in particular an axial length greater, by an amount of between 20% and 50%, than the combined thickness of the layers of material packed together.

The washer 4 is then fitted on the stem 8 and is positioned in contact with the surface of the last one of the layers of material, here the layer L2. Then, with reference to FIG. 2, the washer 4 is axially deformed using a hollow cylindrical punch P that acts axially on the flange 14, compressing it.

This, as may be seen in FIG. 4A, creates a radial flow of material of the washer 4 that presses against the stem 8 coming to create a condition of interference therewith, and in particular with the surface sculpturing 10 of the stem 8.

According to the invention, the presence of the surface sculpturing 10 multiplies the area of contact between the material of the washer 4 and the stem 8 itself, increasing the load that can be withstood by the joint in an axial direction.

Figure 2A:
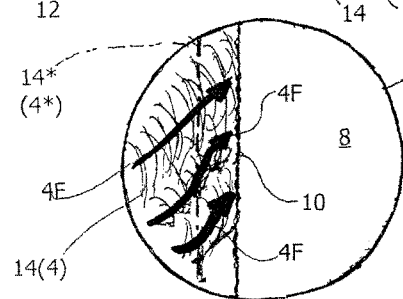
FIG. 2A is an enlarged detailed view thereof.

In the detail of FIG. 2A, there may be seen the lines of flow 4F of the material that plastically flows towards the stem 8 and around the through hole 11 in the undeformed condition of the washer 4 (identified by the reference 14* or 4*). It should be noted in fact that the axial action of the punch P against the flange 14 creates a reduction in diameter of the through hole 11, which passes from the condition of play visible in FIG. 1 (present at the moment of the installation of the washer 4 on the stem 8) to the condition of interference visible in FIG. 2.

In order to maximise the action of the punch P, the active end thereof is provided with a convex annular relief BP (having a toroidal shape), which facilitates radial flow of the material of the washer 4. Moreover, the punch P comprises a central cylindrical cavity CP sharing the axis X1, which can be connected to a source for suction of swarf. By means of this arrangement, it is possible to handle the evacuation of the swarf coming from the overlapping layers during insertion of the rivet 2.

The punch P is axially mobile between the clamping dies M2 (or between the opposite sides of the clamping die M2 if this is monolithic), which substantially implies that it is constantly set in a position corresponding to the joint 1 already at the moment of tightening of the clamping blocks M1 and M2 on the overlapping layers: hence, provision of the cavity CP exactly in the punch P constitutes a major simplification of the operations of removal of swarf.

With reference to FIGS. 3 and 4, a second embodiment of the connection system according to the invention will now be described.

The reference 100 in FIG. 3 and in FIG. 4 designates as a whole a connection system according to a second embodiment of the invention, which once again is intended for application in the case of two or more overlapping layers of material, such as the layers L1 and L2. As for the joint of the system 1 the layers that can be joined together may be in a higher number and are preferably layers of composite material, for example composite material with polymeric matrix reinforced with carbon fibre or glass fibre. In alternative embodiments, it is moreover possible to join metal-matrix composite materials or else hybrid complexes comprising metal-matrix composite materials and polymeric-matrix composite materials. In further alternative embodiments, hybrid joining of a layer of composite material and a layer of metal material is moreover envisaged.

The system 100 comprises a rivet 102 and a washer 104. The rivet 102 includes a head 106, preferably of a cylindrical shape, and a stem 108 of a cylindrical shape provided integral with the head 106.

As may be seen in FIG. 3, the head 106 of the rivet 102 is configured to bear upon a first one of the two or more layers of material—in this case the layer L1 —, whereas the stem 108 is configured for passing through all the layers of material and projecting axially beyond them, in particular beyond the last of the overlapping layers (opposite to the first layer), which here corresponds to the layer L2.

In this embodiment, however, the degree of axial protrusion of the stem 108 from the complex of overlapping layers is less than what characterizes the system 1.

In fact, in this embodiment, the stem 108 is provided as a hollow body that includes a central blind cavity 109 and is to be housed within a seat provided on the washer 104. Like the stem 8, the stem 108 comprises an outer surface 110 that presents a surface sculpturing preferably throughout its extension, and in any case along an axial extension that covers at least 80% of the length starting from the free end of the stem opposite to the head 106. This surface sculpturing may include, for example, a knurling or else a complex of circular surface ridges sharing an axis X100 of the joint.

The washer 104 is provided as a blind body and includes a central recess 111, of a cylindrical shape, bordered by a peripheral band 112 and moreover delimited by a bottom wall 114, which shares the axis X100. Once again as regards the axis X100, the peripheral band 112 has a first thickness t112 in an axial direction, whereas the bottom wall 114 has a second thickness t114 smaller than the first thickness t112 and in particular comprised between 20% and 40% of the thickness t112.

At the moment of installation of the connection system 100, it is first required to pre-arrange two or more layers of material L1, L2 at a joining area where it is desired to connect the layers permanently to one another. This joining area may, for example, correspond to an area where two or more flaps or bands of two components to be connected together are set on top of one another.

The layers L1 and L2 are then clamped at opposite ends of the overlapping area, for example by means of a complex of clamping dies M1, M2, which are not represented in FIG. 3 for simplicity, but may be seen in FIG. 4. The clamping blocks form part of a tool-kit that is used for creating the joint. Clamping of the layers L1, L2 precedes introduction of the rivet 102 in order to prevent failure of the layers at the moment of insertion thereof.

Once clamping has been carried out, the rivet 102 is introduced through the layers themselves. Introduction of the rivet 102 shears the layers L1, L2 in the section where the stem 108 penetrates and terminates at the moment when the head 106 comes into the contact with the layer L1, with the stem 108 that passes right through the stack of overlapping layers L1, L2 to project axially beyond the layer L2. It should be noted that unlike the system 1, the system 100 is configured for withholding the swarf, which simply flows away into the cavity 109.

Axial projection of the stem 108 beyond the last layer L2 is required for fitting the washer 104 and fastening the joint. In this regard, in line with what has been described previously, the stem 108 must have an axial length greater than the combined thickness of the layers of material L1, L2 (whatever their number) packed together. However, in this case the reference parameter to be considered for reducing the excess length is preferably the depth of the recess 111, i.e., in this embodiment, the difference between the thicknesses t112 and t114.

The excess is hence comprised between 80% and 90% of the depth of the recess 111 (in this case, between 80% and 90% of the difference t112–t114).

The washer 104 is then fitted on the stem 108 so as to accommodate the latter within the recess 111 and is positioned in contact with the outer surface of the last of the layers of material, here the layer L2, opposite to the surface of the layer L1 upon which the head 106 bears. Deformation of the washer 104 then takes place—according to the modalities described hereinafter—with axial action on the peripheral flange 112.

The tool that brings about axial deformation of the washer 104 is a cylindrical punch P1 that may preferentially be made in a way identical to the punch P, or else made as a solid body. The punch P1 is provided with an annular (toroidal) relief BP with a convex surface that acts axially on the peripheral band 112 to create a reduction in diameter of the recess 111, and in particular to create a radial plastic flow of material that engages a terminal portion of the stem 108 at the free end thereof. This terminal portion is the one that is accommodated within the recess 111 at the moment when the washer 104 is fitted in place.

The detail of FIG. 4A shows once again the directions of flow 104F of the material of the washer 104 at the moment of deformation by the punch P1, the reference 104* corresponding to the undeformed condition. It should be noted that the action of constriction that in the system 1 regards the hole 11 is here exerted on the walls of the recess 111, which is pressed onto the outer surface of the stem 108, passing from the initial condition of play to a condition of interference.

As already described, the presence of the surface sculpturing on the outer surface of the of the stem 108 multiplies the area of contact between the washer 104 and the stem 108, increasing the axial force that can be withstood by the joint. It should moreover be noted that in this embodiment there is no need for a system of suction of swarf in so far as any possible swarf produced at the moment of insertion of the rivet in the ensemble of the layers of material can evacuate into the cavity 109 and remain withheld therein.

In the preferred embodiment illustrated herein, a second punch P2 is moreover provided, which shares the axis X100 and is coaxial to the punch P1, and is in particular mobile axially (and along the axis X100) within the central cavity of the punch P1. The punch P2 has a convex active end and is configured for acting on the bottom wall 114, bringing about deformation thereof towards the inside of the recess 111 and, in the ultimate analysis, towards the cavity 109.

In this way, formation of an omega-shaped gap between the stem 108 and the recess 111 is facilitated, thus improving distribution of the flows of material 104F. In the absence of the punch P2, especially for small thicknesses t114, it is in fact possible for a significant amount of the flow of material generated at the moment of deformation by the punch P1 to cause a deformation due to buckling (outwards) of the bottom 114 instead of a concentration of material at the interface between the recess 111 and the stem 108.

In general, with each of the two embodiments 1, 100 of the system according to the invention, it is possible to implement a method for joining two or more overlapping layers L1, L2 of material, the method comprising:

setting the two or more layers of material L1, L2 on top of one another in a joining area;

clamping the two or more layers of material L1, L2 at opposite ends of the overlapping area;

introducing the rivet 2, 102 through the two or more layers of material until there the head 6, 106 of the rivet comes into contact with the first layer of the overlapping area (here the layer L1), and getting the stem 108 to project beyond the last one of the overlapping layers (here the layer L2);

fitting the washer 104 on the stem 108 and positioning it in contact with the surface of the last one of the overlapping layers (here the layer L2); and bringing about axial deformation of the washer 104 from an undeformed condition in which it fits on the stem 8, 108 with play, to a deformed condition in which it fits on the stem 8, 108 in a condition of interference with the outer surface of the stem 8, 108, in particular with the surface sculpturing provided thereon.

The person skilled in the branch will hence appreciate that the connection system illustrated herein enables the technical problems mentioned at the outset to the present description to be solved. The tightening modalities of the two joining systems are based upon an action of deformation and grip that mainly involves the interface between the washer and the stem of the rivet, transferring onto the overlapping layers L1, L2 only an action of pure axial compression, which is on the other hand distributed over a relatively extensive area such as that of the heads 6, 106 and of the washer 104.

Hence the risk of failure and/or abrasion of the materials of the layers L1, L2 is significantly reduced, if not eliminated altogether.

Of course, the details of implementation and the embodiments may vary widely with respect to what has been described and illustrated herein, without thereby departing from the scope of the present invention, as defined by the annexed claims.

The invention claimed is:

1. A connection system for connection of two or more overlapping layers of material, comprising:

a rivet including a head and a stem, the head being configured, in use, to bear upon a surface of a first layer of said two or more layers of material, the stem having an outer surface that comprises a surface sculpturing, and being configured, in use, for passing through said two or more layers of material and projecting beyond them; and a washer configured to fit on said stem and configured to bear, in use, upon a surface of a last layer of said two or more layers of material, said washer being deformable by axial compression from an undeformed condition in which it fits on said stem with play, to a deformed condition in which it fits on said stem in a condition of interference with said outer surface of the stem, wherein said stem is a hollow body, and said washer is a blind element so that said washer is configured to contain any swarf resulting from said rivet, in use, passing through said two or more layers of material and projecting beyond them.

2. The connection system according to claim 1, wherein said washer includes a peripheral band that borders a central recess delimited by a bottom wall.

3. The connection system according to claim 2, wherein said peripheral band has a first thickness, and the bottom wall of said central recess has a second thickness, said second thickness being comprised between 20% and 50% of said first thickness.

4. A riveted joint comprising two or more overlapping layers of material connected by a connection system according to claim 1.

5. The riveted joint according to claim 4, wherein said two or more overlapping layers of material are layers of composite material with polymeric matrix reinforced with carbon fiber or glass fiber.

6. A method for joining two or more overlapping layers of material by a connection system according to claim 1, comprising:
  setting the two or more layers of material on top of one another in a joining area;
  clamping said two or more layers of material at opposite ends of an overlapping area of said two or more layers of material;
  introducing said rivet through said two or more layers of material until the head of the rivet comes into contact with the first layer of the two or more layers of material, and getting said stem to exit beyond the last layer of the two or more layers of material;
  fitting said washer on said stem and positioning it in contact with the surface of the last layer of the two or more layers of material; and
  providing axial deformation of said washer from an undeformed condition where it fits on said stem with play, to a deformed condition where it fits on said stem in a condition of interference with said outer surface of the stem.

7. The method according to claim 6, wherein bringing about axial deformation of said washer comprises bringing about axial deformation of a peripheral band of said washer to reduce a diameter of a central recess bordered by said peripheral band.

8. The method according to claim 7, wherein bringing about axial deformation of said washer moreover includes bringing about axial deformation of a bottom wall of the central recess.

9. The method according to claim 7, wherein axial deformation of said peripheral band is carried out using the hollow cylindrical punch.

10. The method according to claim 9, wherein axial deformation of a bottom wall of said central recess is carried out using a cylindrical punch axially mobile along an inner cavity of said hollow cylindrical punch.

* * * * *